United States Patent [19]

Short et al.

[11] Patent Number: 4,976,896
[45] Date of Patent: Dec. 11, 1990

[54] PROCESS OF MAKING THERMOFORMABLE LAMINATE FILMS AND PROCESSES

[75] Inventors: William T. Short, Southfield; Rebecca S. Hoerner, Grosse Point Woods, both of Mich.

[73] Assignee: General Motors Corporation, Detroit, Mich.

[21] Appl. No.: 233,311

[22] Filed: Aug. 17, 1988

[51] Int. Cl.⁵ .................. B29D 11/00; B05D 3/12; B32B 27/06
[52] U.S. Cl. .................................. 264/1.9; 264/1.3; 264/2.7; 264/108; 264/134; 264/553; 264/554; 428/425.9; 427/398.1
[58] Field of Search ............... 428/337, 425.9, 463; 427/407.1, 398.1; 264/1.9, 2.7, 292, 291, 510, 553, 1.3, 108, 134

[56] References Cited

U.S. PATENT DOCUMENTS

| 3,660,200 | 5/1972 | Anderson et al. | 156/306 |
| 4,028,163 | 6/1977 | Frey | 156/229 |
| 4,172,745 | 10/1979 | Van Manen | 156/84 |
| 4,235,949 | 11/1980 | Van Manen et al. | 428/31 |
| 4,268,570 | 5/1981 | Imanaka et al. | 428/216 |
| 4,330,352 | 5/1982 | Grimes et al. | 156/235 |
| 4,362,775 | 12/1982 | Yabe et al. | 428/213 |
| 4,439,479 | 3/1984 | Kanai et al. | 428/148 |
| 4,493,872 | 1/1985 | Funderburk et al. | 428/332 |
| 4,533,704 | 8/1985 | Alexander et al. | 525/440 |
| 4,563,372 | 1/1986 | Kurauchi et al. | 427/409 |
| 4,569,887 | 2/1986 | Cowles | 428/423.1 |
| 4,769,100 | 9/1988 | Short et al. | 156/285 |

Primary Examiner—George F. Lesmes
Assistant Examiner—Christopher Brown
Attorney, Agent, or Firm—Randy W. Tung

[57] ABSTRACT

Thermoformable laminate films with a decorative feature include a polymer carrier film, a paint layer and an optional protective clearcoat and the clearcoat and paint layer have a preconfiguration which produces uniform decorative color appearances following deformation of the laminate by a thermoforming process. To accomplish such results, the laminated film has a carrier film prestretched to orient pigment flakes in the paint layer prior to molding, thereby to reduce strain levels required to mold the laminate with an acceptable surface appearance. The process of manufacture includes the steps of painting a polymeric support or carrier film and prestretching the painted carrier film to control the color hue appearance of the laminate as applied to an underlying relatively rigid substrate or body part.

4 Claims, 2 Drawing Sheets

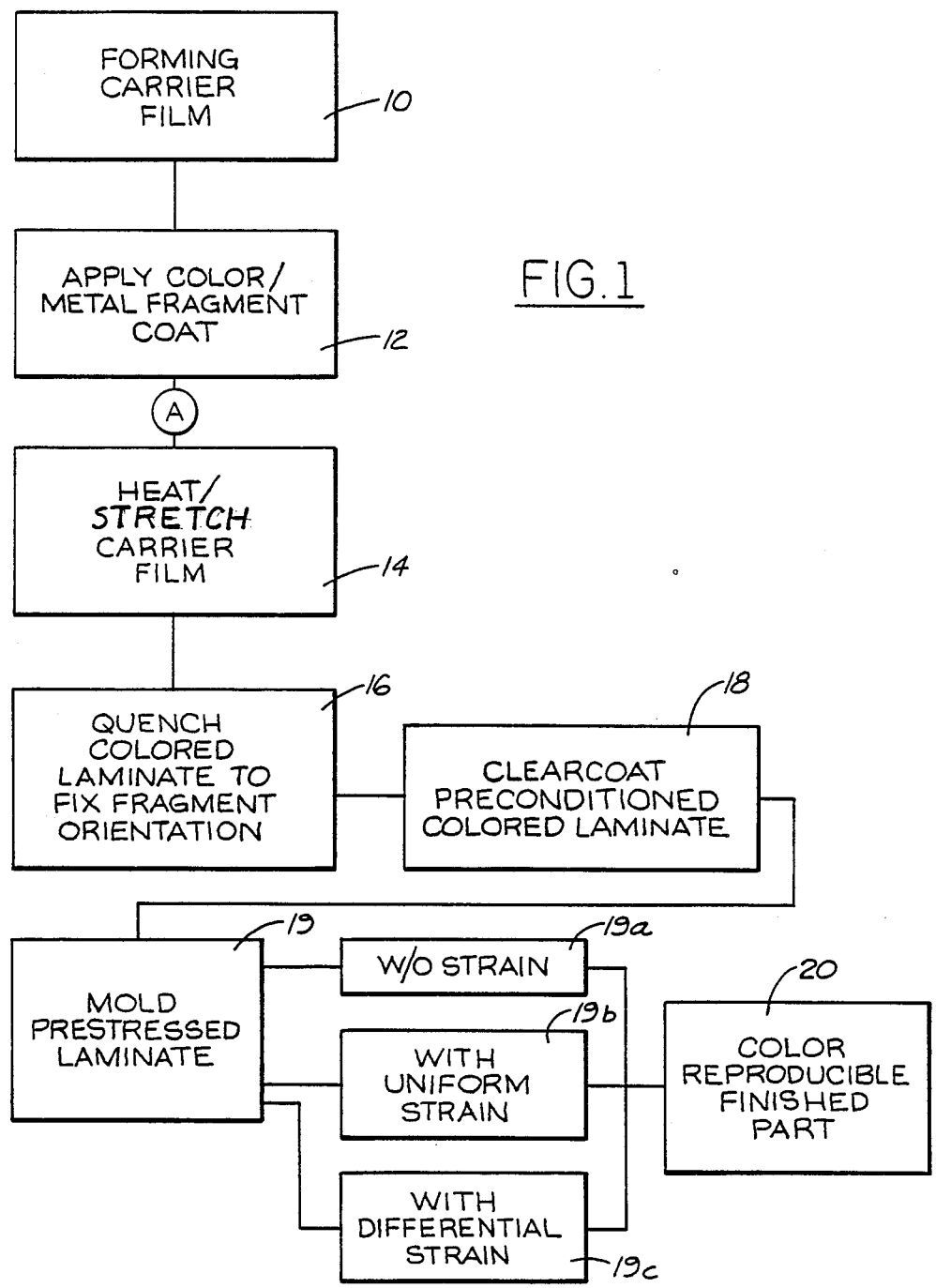

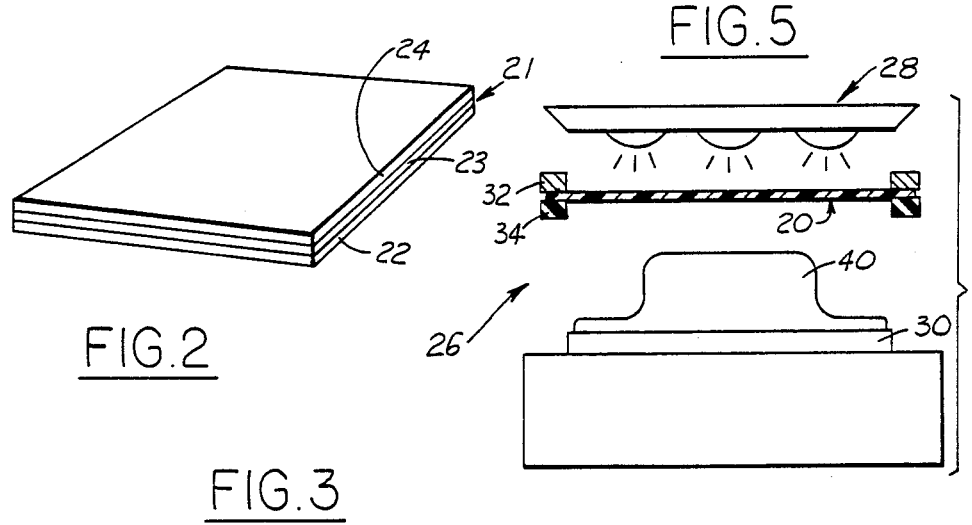
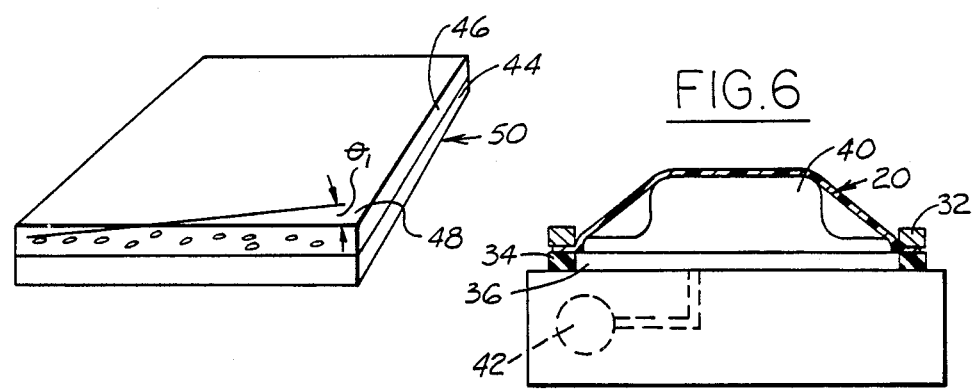
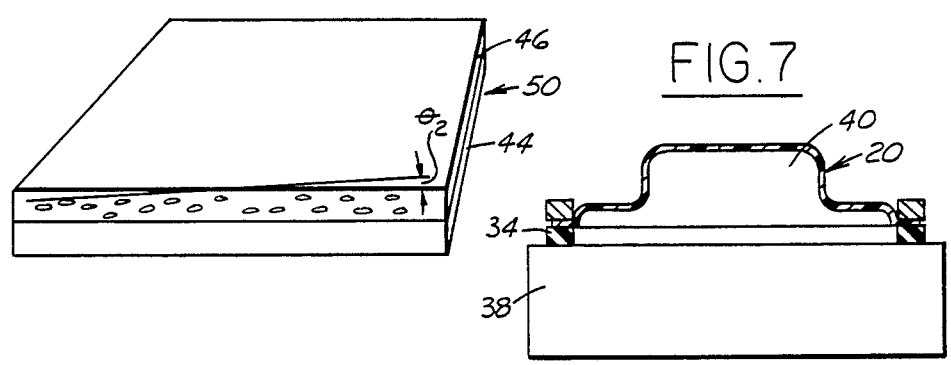

PROCESS OF MAKING THERMOFORMABLE LAMINATE FILMS AND PROCESSES

FIELD OF THE INVENTION

This invention relates to laminated coverings adapted to be thermoformed into bonded relationship with a relatively rigid substrate and more particularly to such laminates having a painted layer and to a process for pretreating such laminated coverings to retain desired color characteristics following molding of the laminated covering.

BACKGROUND OF THE INVENTION

It is known to process unfinished vehicle body parts to produce finished ready to use parts by thermoforming a decorative laminate to mold the laminate onto the unfinished surface of the body part.

U.S. Pat. No. 4,028,163 discloses a process for stretching the length of a foil of synthetic plastic to assure that the foil material remains wrinkle-free as it is applied to an underlying door panel. In particular, the specified tensioning method assures that the foil remains under tension until it is wrapped around the edge of a door panel.

U.S. Pat. No. 4,569,887 discloses a vehicle body coating composition which includes a uniformly dispersed pigment oriented by use of a chlorinated polyolefin.

U.S. Pat. No. 4,172,745 discloses a method to tension a laminate of polyester material bearing a layer of metallic material both bonded to a substrate of PVC material. The tensioning occurs below the annealing temperature of the laminate and serves to strain the laminate to cause it to shorten upon reheating but to remain stable during shipping and storage.

U.S. Pat. No. 4,439,475 discloses a film of polyethylene terephthalate which is biaxially stretched to improve the physical characteristics of products such as magnetic tapes.

U.S. Pat. No. 4,493,872 discloses prestretching plastic film to impart strength and toughness.

Other patents relating to polymer laminates with decorative features are shown in U.S. Pat. Nos. 3,660,200; 4,235,949; 4,330,352; 4,362,775; and 4,563,372.

None of the above references discloses a process for preforming the laminated structure in a manner which will control color hue appearance in the molded product.

SUMMARY OF THE INVENTION

Known processes for preventing loss of gloss and changes in color during thermoforming of a laminated film of the type having a colored base coat or painted film layer have included steps to prevent loss of gloss or changes in color when the laminated material is molded on a substrate.

One approach has been to provide a polymeric carrier film, a paint layer and a clear protective top coat. The prevention of loss of gloss in prior laminates has been accomplished by forming a controlled clearcoat thickness (on the order of 1–5 mil) as part of the initial laminate structure.

One problem has been to assure that such a process will produce reproducible decorative color effects under mass production conditions. The aforedescribed laminate is stretched during molding to orient metal or pigment flakes substantially parallel to the surface of the finished part to yield reproducible coating appearances. In some cases, however, it is desirable to mold the laminate without stretching the paint layer. Such stretch can produce differences in the shape of the decorative feature. In other cases, some parts of the laminate are strained and other parts remain unstrained. Such differential strain can cause uneven orientation of the flakes and resultant undesired surface appearance differences. For purposes of this case, the term platy fragments shall mean paint or pigment flakes, metal flakes or other like platy fragments.

An object of the present invention is to provide the aforesaid laminate in a form in which the surface appearance is controlled in the molded polymeric film by providing a prestretched pigmented color layer or pigmented base or carrier film layer with preoriented platy fragments such that the laminate can be applied to an unfinished part with different levels of strain and with reproducible, evenly colored finish appearances.

A further object of the present invention is to provide a preshaped laminate of the type set forth in the preceding objects wherein the color coat of the laminate includes flakes of pigment (or of metal) and is a uniform color and wherein the carrier film is prestretched to enlarge the usable area of coated film to increase the product yield from a given starting area of such laminate.

Another object of the present invention is to provide a deformable laminate of the type set forth in either of the preceding objects wherein the carrier film is prestretched prior to molding for establishing a paint pigment flake, metal fragment or other platy fragment preorientation for uniform appearance of the decorative aspect in the deformed laminate following either unstrained application, uniform strain application, or unequal strain application of the laminate to a substrate body.

A further feature of the present invention is to provide a method of manufacture which includes the steps of coating a polymeric support or carrier film with a paint layer containing pigment and/or metal or platy fragments and prestretching the carrier film by a preset amount to prealign the pigment flakes to produce reproducible, evenly colored surface appearances when applied to an underlying relatively rigid, unfinished substrate body.

Still another feature of the present invention is to provide a method of the type set-forth in the preceding object wherein a painted laminate has its carrier prestretched greater than 5%, preferably greater than or equal to 20%, to draw the laminate to reduce orange peel effects, e.g., short order surface wave caused by minor irregularities in the thicknesses of the surface coatings. This causes an improvement in gloss and increased sharpness and distinction of painted images such as logos, decorative shapes or the like formed by printing or rotogravure techniques or paint/ink applications on the carrier film.

Other objects are to control such finish surface appearances by providing a clearcoat on the laminate prior to or after prestretching to align metal or pigment fragments prior to molding.

Another object is to control such surface hue appearances by predrawing a laminate including a polymer carrier film, a colored base coat and a protective clearcoat (when present) to reduce orange peel effects when the laminate is molded to an unfinished part.

Other objects, features and advantages of the present invention will be readily appreciated as they become better understood with reference to the following description when considered in conjunction with the accompanying drawings wherein:

BRIEF DESCRIPTION OF THE DRAWINGS

FIG. 1 is a chart showing the process of the present invention;

FIG. 2 is a typical laminate used in decorative thermoformable laminates;

FIG. 3 is a diagrammatic perspective view of an embodiment of the laminate of our invention showing the fragment repose angle prior to stretching;

FIG. 4 is a diagrammatic perspective view of the laminate in FIG. 3, following preorientation of the fragment repose angle.

FIGS. 5–7 are diagrammatic views of thermoforming apparatus for molding the laminates of the present invention.

DETAILED DESCRIPTION OF THE PREFERRED EMBODIMENTS

Referring now to FIG. 1, the process of the present invention includes the steps of forming 10 a thermoformable carrier film from a family of thin polymers including any suitable polymer which is deformable by application of heat thereto.

The process includes coating 12 the carrier film with a paint coat in the laminate. The process includes heating and stretching 14 the paint coated carrier film.

The stretched laminate is then quenched 16 to fix metal and/or pigment fragment orientation. Although the coating and prestretching steps have been described as two distinct processes, there is no reason that application of the coating and stretching or tentering of the laminate could not be combined into a single operation, either during a base coating or clearcoating step.

Prior to (as indicated by A in FIG. 1) or following prestretch control by the stretch 14 and quench 16 steps, the laminate can be clearcoated 18. The pigment or metal flake orientation in the paint coat is such that uniform, reproducible surface appearance is attained following exposure of the laminate to the heater array of a thermoforming apparatus. The process enables molding 19 the heated laminate against a relatively rigid substrate such as a car door panel and the molding step can be with no strain 19a, uniform strain 19b, or strain differentials 19c in the laminate without affecting the appearance of the paint coat in the final part 20.

In brief, the process includes forming a polymeric carrier film, painting it or printing it with paint containing metal or pigment fragment type materials. Processes such as silk screening or rotogravure printing can be employed to deposit the color material. All of the above coatings are referred to herein as decorative effects. The decorative effects which may be clearcoated are preconditioned by a method which will enable the laminate to be thermoformed and will result in reproducible decorative surface appearances.

The process uses a selected prestretched of the laminate to align platy fragments such as pigment/metal fragments in the laminate for finishing the surfaces of a rigid substrate such as automobile body panels or the like with reproducible appearances under mass production conditions. The variety of chroma effects are established in a controlled manner as the thermoformable polymeric film laminate is molded to the substrate either in a manner which produces no laminate strain, uniform laminate strain or uneven laminate strain.

A typical laminate 21, shown in FIG. 2, has a polymeric carrier film 22; a paint layer 23 and a clear protective top coat 24.

Typical thermoforming apparatus 26 for heating the laminated material is shown in FIGS. 5–7. It includes radiant heaters 28 arranged in a suitable array for raising the temperature of a laminate to a point that it can be molded against a substrate. The illustrative apparatus 26 has a vacuum buck 30 and a support frame 32 for the laminate. A gasket 34 is provided on the frame 32 for sealing the periphery 36 of the buck 30 on a vacuum form table 38. While a vacuum forming system is illustrated, it should be understood that any differential forming system is suitable to mold such laminates.

In such apparatus the laminate 20 is clamped in the frame 32. The radiant heaters 28 are energized to soften the polymeric material. Once the carrier film (and other layers of the laminate) are sufficiently softened, the frame 32 is lowered from the heaters 28 to be positioned to cause the laminate 20 to be draped over the substrate part 40.

Gasket 34 is positioned t seal against the buck 30 and a vacuum source 42 is operated to produce a pressure differential across the laminate 20 to firmly mold it in place on the substrate part 40.

The laminate 20 can optionally be backed by an adhesive layer or an adhesion promoter for enhancing the bond between the molded laminate and the substrate, or used without adhesive in processes such as injection molding or reaction injection molding, where sufficient adhesion is provided by the process of forming the substrate to the laminate. Finally, the prestretched laminate could also be used in the form of a separate preformed insert, for use in subsequent in-mold manufacturing operation.

In the past, such molding oriented metal or other platy paint pigment flakes in a manner dependent upon the shape of the substrate against which the laminate was molded. Such mold steps tend to strain the laminate in a differential manner to produce fragment orientation in one part of the laminate which differs from orientation in another part. Such differences produce unpredictable variation in surface appearance.

The following examples demonstrate the invention.

EXAMPLE 1

A carrier film 44 of the type shown in FIG. 3 is selected from a suitable class of thermoformable carrier film material such as thermoplastic polyurethanes, polyesters, vinyl copolymers, polyvinylchloride and blends, copolymers or alloys thereof. It should be understood that the listed materials are merely cited as examples of suitable deformable carrier films on which a decorative feature can be applied.

In this embodiment of our invention, the process includes the step of coating the thermoformable carrier film with an elastomeric aluminum flake paint. The color coat 46 is characterized by having a matte or satin finish if deformed without a clearcoat protective layer.

The color coated carrier film 44 is then heated to soften the film. The carrier film 44 is then stretched either biaxially or longitudinally and held under tension. The tensioned, color coated carrier film is then quenched by air cooling. The angle of repose following tension and quenching produces a preoriented disposition of the color platy, flaked pigment fragments with respect to film surface 48 from an angle $\theta_1$ of repose with respect to the film surface 48 to an angle $\theta_2$, which is less than angle $\theta_1$ to cause the fragments to be closely parallel to the surface 48.

In accordance with the process of the present invention the paint coat of uniform hue is then coated with a layer 48 of a clearcoat to form a preconditioned laminate 50 which molds to define a surface appearance of soft or satin finish. The preconditioned laminate 50 retains a desired surface appearance in a finished product even if the laminate is applied without further strain. The preorientation produces a better appearance than that of well applied spray paint lacquer coatings and without the attendant mass production problems found in such spray paint processes including but not limited to part cleanliness, paint solvent emissions, masking and the like.

In this example, durability of the finished part is maintained because there is a clearcoat covering on all portions of the finished part (as well as on the base coat or carrier film). Consequently, UV rays are screened by clearcoat stabilizers, a variety of which are commercially available and commonly used in automotive coatings. It should be understood that the clearcoat can be selected from a wide range of transparent or tinted clear polymers so long as the clearcoat is compatible with the material of the paint or color coat and is deformable during the thermoforming of the laminate to the substrate material. Solvents in the clearcoat should be selected with care to avoid stress cracking the strained laminate. The preorientation of the platy or flake pigments determines reorientation of such fragments during the molding processes. The stretched carrier film is effective in controlling the color match of finished parts since it can be applied without carrier film strain, with uniform carrier film strain, or with a differential carrier film strain. In all cases, the preorientation of pigment or metal flakes establishes a baseline that will follow through in the finished molded product.

EXAMPLE 2

Samples of a flexible silver high solids automotive lacquer were rollcoated onto a 10 mil amorphous polyester carrier film. Strips of this film were heated in an oven to ca 224° F. until the carrier film softened slightly then stretched various amounts. In the example cited here, the stretching was 13%. The warm films were held under tension until quenched by cooling and then sectioned and examined under a microscope for flake alignment. The average angle of repose of the aluminum flakes prior to stretching was found to be 5.6 degrees (relative to the film surface). After stretching, the average angle value was 2.7 degrees. The oriented value is equivalent to that obtained at even much higher strains in previous work (Ser. No. 881,344 filed 7-2-86 now abandoned) and better than that of even well sprayed lacquer coatings. The effect of improved orientation on color uniformity and orange peel were immediately apparent to the eye.

In automotive areas including body part finishing, the prestretching effects of this magnitude may be of very great value since color match of finished parts is vital, and differential effects near adjoining edges are liable to be extreme in the absence of the preconditioning steps of our invention.

EXAMPLE 3

Even more dramatic color hue effects are produced if the techniques of the aforedescribed examples are enhanced by adding a transparent pigment to the clearcoat so as to further accent both gloss and hue changes due to thickness control of the clearcoat. An illustration of such pigment additions would be to add soluble iron oxides, organic dyes, and the like to the clearcoat compositions mentioned above. The transparent pigments in the clearcoat layer serve to diffuse the incoming light to produce highlighting of the preoriented paint coat colors to retain desired gloss in the finally molded product.

INDUSTRIAL APPLICABILITY

An advantage of the prestretched carrier film process of the present invention is that reproducible color parts can be manufactured by mold processes in which a preconditioned carrier film remains unstrained, is uniformly strained, or is differentially strained. This reduces the need to mix multiple batches of different colored paint stocks to obtain a uniform color.

The process of the present invention has been described in an illustrative manner. It is to be understood that the terminology which has been used is intended to be in the nature of words of description rather than of limitation.

What is claimed is:

1. A process for producing laminated decorative films having platy fragments therein for establishing a thermoformable film that can be molded without strain, with uniform strain or with strain differential in the film while maintaining a reproducible color appearance in the surface finish of a part covered by the film consisting of the steps:

providing a thermoplastic polymeric carrier film;

depositing a colored base coat and optionally a clearcoat of 1-5 mils in thickness on the carrier film, said base coat having platy fragments therein with an initial angle of repose with respect to the surface of the deposited coat which will respond to subsequent strain molding of the carrier film to adjust to a second strain related angle of repose; and preconditioning the carrier film following application of the colored base coat with or without clearcoat by stretching said film following softening to increase the usable area thereof by greater than 5% and by quenching after said stretching to fix said platy fragments at an angle of repose which is less responsive to mold induced strain so as to stabilize the finish appearance of a product when the laminate is molded thereagainst to cover an unfinished surface thereof.

2. In the process of claim 1, preconditioning the carrier film following application of the colored base coat by increasing the temperature thereof to soften the carrier film sufficiently to permit drawing or stretching;

stretching the coated carrier film following softening to increase the unable surface area thereof in the range of 5 to 100% for causing the change in the angle of repose of the pigment and or metal fragments; and quenching the coated carrier film following tensioning thereof to fix the pigment and or metal fragments in the mold insensitive angle of repose.

3. In the process of claim 2, tensioning the carrier film to cause the initial deposited angle of repose of said platy fragments to be reduced by over 50% to produce an average angle of repose equal to or less than 10°.

4. In the process of claim 1, stretching the carrier film to cause the initial deposited angle of repose of said platy fragments to be reduced by over 50% to produce an average angle of 10° or less.

* * * * *